March 26, 1940.

C. H. KING ET AL
MILLING MACHINE
Filed Sept. 29, 1938

INVENTORS.
CHARLES H. KING, EARL J. SEAVER,
BY Walter E. Schirmer
ATTORNEY.

March 26, 1940.  C. H. KING ET AL  2,194,829
MILLING MACHINE
Filed Sept. 29, 1938  2 Sheets-Sheet 2
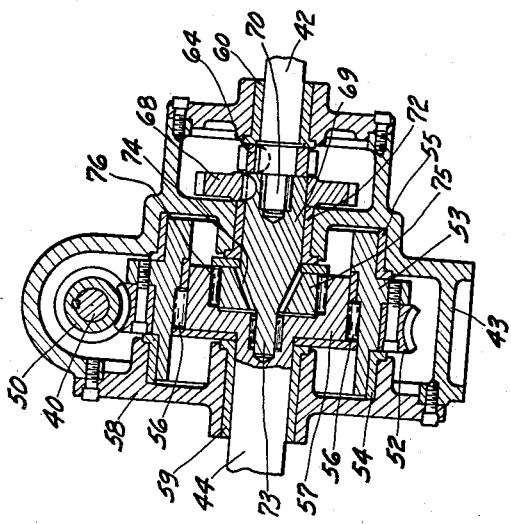
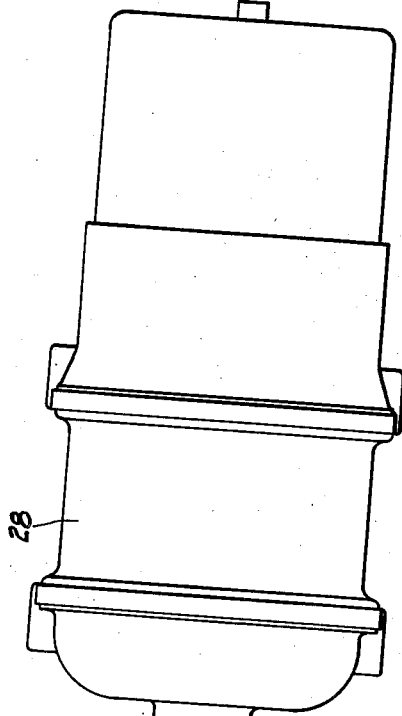
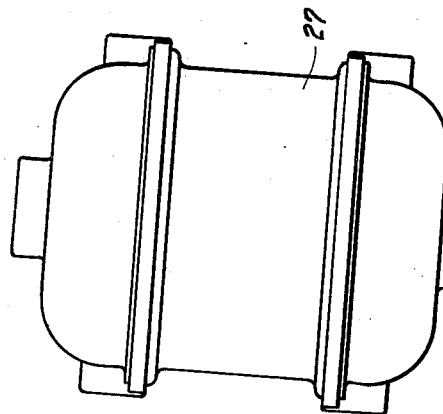
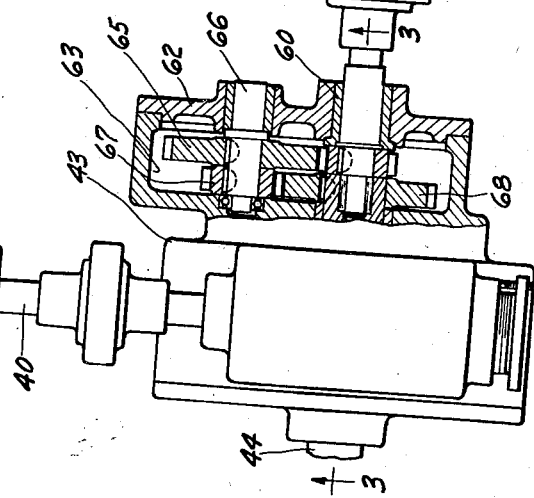
INVENTORS.
CHARLES H. KING. EARL J. SEAVER.
BY Walter E. Schirmer
ATTORNEY.

Patented Mar. 26, 1940

2,194,829

UNITED STATES PATENT OFFICE 2,194,829

MILLING MACHINE

Charles H. King, Buchanan, and Earl J. Seaver, Battle Creek, Mich., assignors to Clark Equipment Company, Buchanan, Mich., a corporation of Michigan Application September 29, 1938, Serial No. 232,256

11 Claims. (Cl. 90—18)

This invention relates to machines for milling or cutting on cylindrical surfaces, and more particularly is directed to an adaptation of such a machine for intermittently cutting and then rapidly traversing the circumferential spaces between an object having spaced cylindrical surfaces to be cut.

The primary object of the present invention is to provide a mechanism which will automatically feed the work past the cutter at the proper speed for performing an efficient cutting operation, and will then speed up the traverse of the work through the intervening space and automatically slow down the rotation of the work as the next cutting surface is approached. In other words, it is intended by the present mechanism to provide alternate slow cutting and rapid traversing of the work in a circular milling machine or similar machine so as to decrease the time required for a cutting cycle on work of the type having circumferentially spaced surfaces to be milled.

Considering the invention as applied to one specific machine operation, although it is not intended that the invention be thereby limited, it is particularly adapted to the cutting of spoke ends on a cast spoke wheel of the type shown in the patent to Frederick W. Burger, No. 1,971,327, issued August 28, 1934, or of the type shown in the Burger Reissue Patent, No. 19,885, issued March 10, 1936. It has formerly been the practice to clamp such a wheel in a suitable fixture which is rotated past the cutter to mill out the rim and clamp seating surfaces on the spoke ends. However, so far as we are aware, if the speed of rotation of the work is slow enough to provide for efficient and accurate milling of these surfaces, an appreciable amount of time is lost due to the slow rotation of the work from the end of one milling operation until the beginning of the next milling operation on the succeeding spoke.

The present invention, as adapted to such a milling operation, provides for proper control of the rotation of the work to insure efficient milling of the required surface, and as the work, or in the illustrated embodiment, the successive spoke ends leave the milling cutter, the rotation of the work is appreciably increased until the next spoke end is reached, when the speed is automatically retarded in order to insure proper milling.

By reason of this invention we are able to reduce the time required to mill a cast wheel spider of the type referred to approximately 40 or 50%, and also are able to control the operation of the mechanism automatically so that the entire machine will be stopped at the completion of the required milling operations.

The invention primarily consists of employing two constant speed motors geared to the operating shaft which rotates the fixture in such manner that one motor drives the work during the milling operation and the other motor is automatically cut in and picks up the drive at a higher rate of speed in between the successive milling operations. This is accomplished by the use of a gear box employing overrunning clutches to drive the operating shaft at a greater rate of speed by one motor without requiring the shutting off of the other motor.

In a preferred embodiment of the invention the ratio between the two rates of speed is approximately 15 to 1, that is to say, the rapid traverse between successive milling operations, as compared to the speed when the work is being milled.

Preferably, the operation of the mechanism is controlled through limit switches operated by cams controlled by rotation of the fixture carrying the work, these cams being so arranged with respect to the position of the work as to accurately control the slow and rapid traverse of the fixture in accordance with the milling operations desired.

Other objects and advantages of the present invention will appear more fully from the following detailed description which, taken in conjunction with the accompanying drawings will disclose to those skilled in the art the particular construction and operation of a preferred form of the present invention.

In the drawings:

Figure 2 is a top plan view, partly in section, of the operating mechanism; and

Figure 3 is a sectional view taken substantially on line 3—3 of Figure 2 showing the details of the gear box construction.

Figure 1:
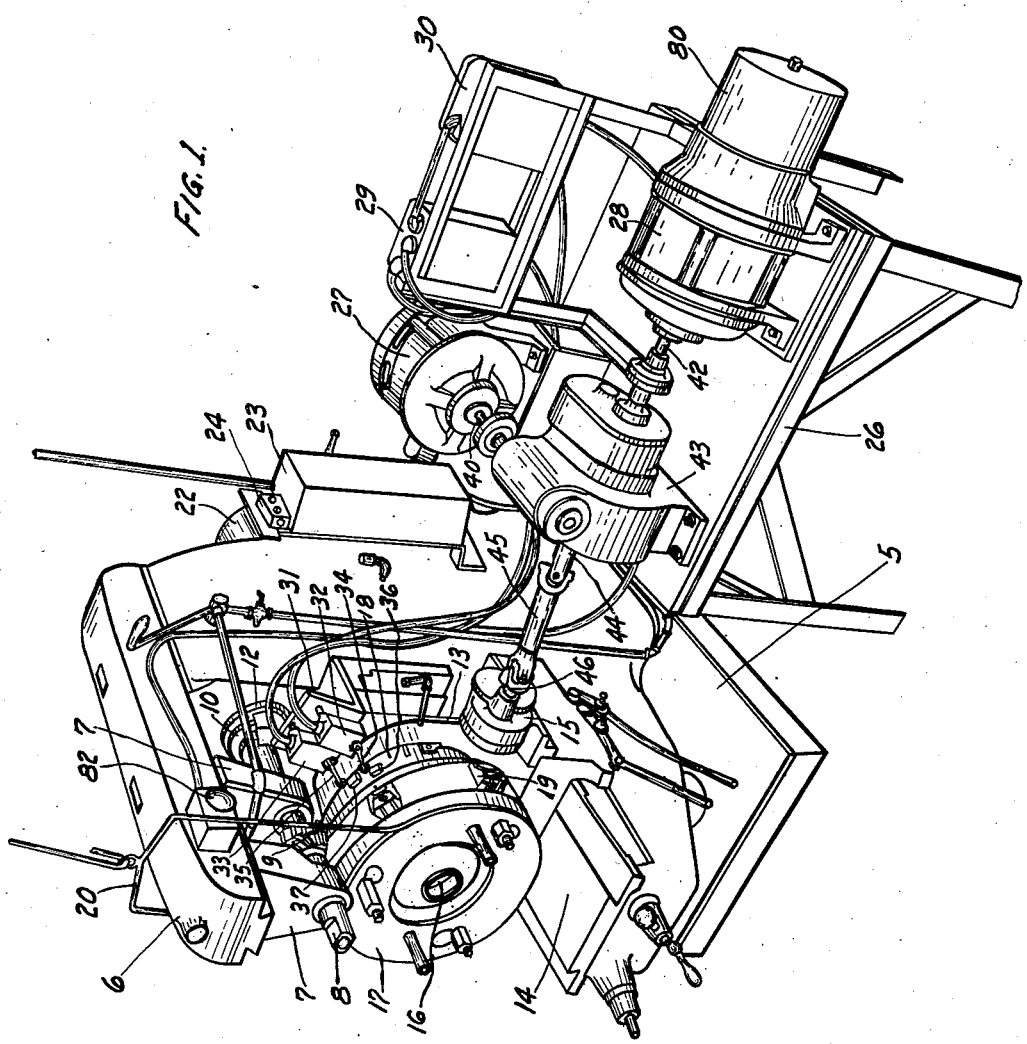
Figure 1 is a front perspective view of a milling machine embodying the present invention.

Referring now in detail to the drawings, a milling machine 5 of more or less conventional type is shown having the overhanging arm 6 upon which is mounted the adjustable journal supports 7 for holding the spindle 8 upon which the cutter 9 is mounted. This shaft is journalled in the upright 10 at one end thereof and driven from suitable gearing connected to an electric motor or the like. The operation of the cutter is preferably entirely independent of the operation of the fixture 13 mounted upon the table 14 of the machine, although one motor might be used for both purposes if so desired, by the use of a power take-off.

The fixture 13 is adjustably mounted on dovetailed guides carried on the knee 14 and is clamped in fixed position in any suitable manner. This fixture carries a gear housing box 15 at one side thereof which is connected to a rotating shaft 16 upon which the support 17 and outer clamping member 18 of the fixture are mounted. These members are adapted to secure therebetween a cast wheel spider 19 of the type shown generally in the above referred to patents, although it is to be understood that any desired type of work may be engaged in the fixture. Due to the weight of the fixture, a suitable cradle or bail 20 is provided supported from an overhead structure and engaging about the free end of the fixture for supporting the weight thereof. The spindle 8 is controlled from a suitable starter box 22 mounted at the rear of the machine and controlled from a switch box 23 having a push-button control 24 therein.

Provided at one side of the machine 5 is a table or similar supporting means 26 which has mounted thereon the two electric motors 27 and 28, these being motors of the constant speed type, both operating at the same speed but with the motor 27 preferably being of slightly greater horsepower than the motor 28. These motors are supplied with suitable power from starter boxes 29 and 30, respectively, and are controlled from switches 32 and 33, respectively, mounted on a bracket plate 31 secured to the frame of the machine. The switches 32 and 33 are of the limit switch type having actuating arms 34 and 35, respectively, adapted to engage suitable cams 36 and 37 carried on the peripheral surface of the clamping plate 18 of the fixture. The clamping plate is preferably adapted to carry a plurality of the circumferentially spaced cams 37 corresponding to the number of spokes on the work 19 or to the number of milling operations required during one rotation of the work in the fixture. However, there is only one cam 36 whereby during a complete revolution of the fixture, the limit switch 32 is operated only once, whereas the limit switch 33 is operated a number of times corresponding to the number of spaces between the milling operations. The purpose of this arrangement will be explained hereinafter.

Considering now the driving connections between the motors 27 and 28 and the gear box 15, it will be noted that each of the motor shafts 40 and 42 is connected through flexible couplings to adjacent sides of a gear box 43 mounted on the supporting table 26. From this gear box a drive shaft 44 is connected through the universally supported link 45 to an operating shaft 46 extending into the gear box 15. There is a reduction in the gear box 15 between the shaft 46 and the second shaft (not shown), which extends transversely across the base of the fixture 13 and drives a suitable worm wheel therein to which the shaft 16 is connected.

Considering now in detail the gear box 43 which is shown more particularly in Figures 2 and 3, the motor shaft 40 extends into the top of the box 43 and within the box is provided with a worm gear 50 keyed or otherwise securely connected to the shaft 40, and having meshing engagement with a worm wheel 52 carried upon a suitable rotatable housing 53 within the gear box. The housing 53 is supported for rotation upon suitable bronze bushing members 54 and 55, respectively, and has a counterbored hub portion provided with cam surfaces for receiving the rollers 56 of an overrunning clutch mechanism disposed between the housing 53 and the enlarged end or hub 57 formed at the end of the operating shaft 44. This shaft is journalled in the gear box side plate 58 by means of the bushing 59.

The drive shaft 42 of the motor 28 extends through a suitable bushing 60 in the side plate 62 at the opposite end of the gear box 43 from the side plate 58, and has keyed thereto within the change speed chamber 63 a relatively small pinion gear 64. This pinion gear 64 is adapted to have meshing engagement with a gear 65 mounted on the stub shaft 66 journalled for free rotation in the gear box, and a second gear 67 is also mounted on the shaft 66 and in turn has driving engagement with the gear 68 keyed to the intermediate or quill shaft 69. This shaft has an axial recess at one end thereof receiving the projecting pilot portion 70 of the shaft 42 which is supported therein by suitable roller bearings, and itself, is journalled in the bushing member 72 formed in the transverse web of the gear box 43. At its inner end the shaft 69 is rotatably supported and piloted in the end of the shaft 44, as indicated at 73, and intermediate its ends is provided with a frusto-conical or tapered portion which is preferably splined as indicated at 74 for receiving a hub member 75 which is secured thereto against relative rotation and which cooperates with the axial recess in the end of the shaft 44 to receive the rollers 76 forming a second overrunning clutch mechanism between the quill shaft 69 and the shaft 44.

It will therefore be apparent that two overrunning clutch mechanisms are provided within the gear box 43, the overrunning clutch 56 between housing 53 and shaft 44 serving to transmit torque from the motor 27 to the shaft 44 when the motor 28 is inoperative, but allowing free rotation of the shaft 44 with respect to the housing 53 when the motor 28 is operated, at which time the overrunning clutch 76 becomes effective to clutch the quill shaft 69 and shaft 44 together for conjoint rotation. When the quill shaft 69 is not driven from the shaft 42, the clutch 76 allows free rotation of the shaft 44 with respect to the hub 75, and thus all driving torque is transmitted during this time from the motor 27 to the shaft 44. The reduction between the operating shaft 40 of the motor 27 and the shaft 44 is about fifteen times as great as the reduction between the operating shaft 42 of motor 28 and shaft 44. Consequently, when motor 28 is inoperative, the entire driving torque is transmitted to the shaft 44 from the motor 27 at a relatively low rate of speed. This produces the cutting or milling operation, and consequently the motor 27 is preferably of higher horsepower than motor 28 in order to provide sufficient power to insure proper cutting of the work.

As the cutter 9 clears the end of the particular part of the work which is to be cut, the work moves therepast where no further cutting action is required until the next circumferentially spaced point is reached. The cams 37 operate the arm 35 of the limit switch 33 to cut in the motor 28 which immediately acts to drive the quill shaft 69, and through the overrunning clutches 76 and 56 releases the transmission of torque from the housing 53 to the shaft 44 and in turn engages the clutch 76 to transmit torque directly from the hub 75 of the quill shaft to the shaft 44. This drives the shaft 44 at a speed substantially fifteen times as great as its speed of rotation during the cutting operation, and rapidly rotates the work to the next cutting position. As this position is reached, a cam 31 on the member 18 engages the arm 35, and thereby cuts out the motor 28 so that the motor 27 picks up the torque load and at a relatively slow rate of speed rotates the work past the cutter to secure the desired cutting operation.

In order to prevent the inertia of rotation of the motor 28 from possibly carrying the work into the cutter at too high a speed, thereby producing an improper cutting action, a brake 80 of any conventional design is connected to the motor 28 to stop its rotation immediately upon opening of the circuit thereto, thus preventing any inertia of this motor from carrying the work at an improper rate of speed into the cutter.

It will be apparent that by using the two overrunning clutches the motor 27 may be constantly operated, and yet will be superseded by the higher speed drive of the motor 28 when the rapid traverse is desired between the cutting operations. The cam 36 is employed to cut out the motor 27 upon completion of one revolution of the work, thus automatically stopping the entire rotation and requiring operation of the push-button control 82 mounted on the arm 6 in order to restart the motor 27 for the next cycle of operations.

It is therefore believed apparent that we have provided a novel type of rapid traverse mechanism suitable for use on any type of cutting or milling machine where the cutting is carried on at circumferentially spaced points, and it is desired to have rapid traverse of the work past the cutter intermediate these points.

We are aware that a number of changes may be made in certain details of construction herein illustrated and described without in any way departing from the underlying principles of the invention, and we therefore do not intend to be limited to the exact details shown and described herein, but only insofar as defined by the scope and spirit of the appended claims.

We claim:

1. The combination, with a milling machine having a fixture for supporting work of such nature as to require cutting at circumferentially spaced peripheral points, of means for rotating said fixture past a cutting tool comprising a pair of motors, a gear box common to both motors, means controlled by one of said motors for rotating the work at cutting speed, and means for selectively actuating the other of said motors in accordance with the rotation of the work to overdrive the one motor for securing rapid traverse thereof between said points.

2. In a metal working machine in which the work is rotated past a fixed cutting means and cutting operations performed thereon at peripherally spaced points, the combination of actuating means for rotating the work comprising two electric motors, a gear box common to both motors and including drive means for rotating the work, said motors rotating said drive means at different speeds, one of said motors constantly operating to rotate said drive means at a cutting speed, and means operated by rotation of the work for selectively actuating the other of said motors to overdrive the one motor to increase the speed of rotation of the drive means intermediate the successive cutting operations.

3. In a metal working machine in which the work is rotated past a fixed cutting means and cutting operations performed thereon at peripherally spaced points, the combination of actuating means for rotating the work comprising two electric motors, a gear box common to both motors and including drive means for rotating the work, and means operated by rotation of the work for selectively actuating one of said motors to increase the speed of rotation of the work intermediate the successive cutting operations, said last-named means including means rendering both motors inoperative upon completion of each revolution of the work.

4. In a metal working machine in which the work is rotated past a fixed cutting means and cutting operations performed thereon at peripherally spaced points, the combination of actuating means for rotating the work comprising two electric motors, a gear box common to both motors and including drive means for rotating the work, and means including a cam controlled limit switch operated by rotation of the work for selectively actuating one of said motors to increase the speed of rotation of the work intermediate the successive cutting operations.

5. In a metal working machine including a cutter, and a rotating fixture for moving the periphery of the work past said cutter to produce cutting operations at successive circumferentially spaced portions on the work, the combination of means for rotating the work comprising two electric motors having a common geared connection to the work, and means in said connection for causing one motor to rotate the work at a faster rate than the other motor without rendering the other motor inoperative.

6. In a metal working machine including a cutter, and a rotating fixture for moving the periphery of the work past the cutter to produce cutting operations at successive circumferentially spaced portions on the work, the combination of means in the fixture for rotating the work, and means for actuating said rotating means comprising a pair of motors and geared connections therefrom to said rotating means, said motors driving said rotating means at different rates of speed, and a plurality of overrunning clutch means for causing one of said motors to drive while the other motor is inoperative and for causing said other motor to drive, when operated, at a greater rate of speed without rendering said first motor inoperative.

7. The combination of claim 6 further characterized in the provision of cam controlled means operated by rotation of the work for selectively energizing said other motor at the cessation of each cutting operation and de-energizing the same prior to initiation of the next succeeding cutting operation.

8. The combination of claim 6 further characterized in the provision of cam controlled means operated by rotation of the work for selectively energizing said other motor at the cessation of each cutting operation and de-energizing the same prior to initiation of the next succeeding cutting operation, and brake means on said other motor for preventing overtravel thereof.

9. The combination of claim 6 further characterized in the provision of cam controlled means operated by rotation of the work for selectively energizing said other motor at the cessation of each cutting operation and de-energizing the same prior to initiation of the next succeeding cutting operation, and means for de-energizing both motors at the completion of each revolution of the work.

10. In combination, a gear box having a worm wheel, a hub within said worm wheel, overrunning clutch means between said hub and wheel, a reduction gearing having a shaft extending into said hub, overrunning clutch means between said shaft and said hub and driven means connected to said hub and selectively driven thereby from said worm wheel and said reduction gearing.

11. In combination, a gear box having a worm wheel, a hub within said worm wheel, overrunning clutch means between said hub and wheel, a reduction gearing having a shaft extending into said hub, overrunning clutch means between said shaft and said hub, driven means connected to said hub and selectively driven thereby from said worm wheel and said reduction gearing, and means controlled by rotation of said driven means for alternately energizing and de-energizing said reduction gearing during each revolution thereof, whereby said worm wheel alternates with said reduction gearing in supplying driving torque to said hub.

CHARLES H. KING.
EARL J. SEAVER.